US011994280B2

(12) United States Patent
Liao et al.

(10) Patent No.: US 11,994,280 B2
(45) Date of Patent: May 28, 2024

(54) FILM AND TELEVISION LAMP

(71) Applicant: APUTURE IMAGING INDUSTRIES CO., LTD., Guangdong (CN)

(72) Inventors: Xuelin Liao, Guangdong (CN); Haijun Gu, Guangdong (CN)

(73) Assignee: APUTURE IMAGING INDUSTRIES CO., LTD., Guangdong (CN)

(*) Notice: Subject to any disclaimer, the term of this patent is extended or adjusted under 35 U.S.C. 154(b) by 0 days.

(21) Appl. No.: 17/887,552

(22) Filed: Aug. 15, 2022

(65) Prior Publication Data
US 2023/0175683 A1 Jun. 8, 2023

(30) Foreign Application Priority Data

Dec. 6, 2021 (CN) .......................... 202111478171.1

(51) Int. Cl.
| | |
|---|---|
| *F21V 29/76* | (2015.01) |
| *F21V 17/06* | (2006.01) |
| *F21V 29/67* | (2015.01) |
| *F21V 29/83* | (2015.01) |

(Continued)

(52) U.S. Cl.
CPC ............. *F21V 29/76* (2015.01); *F21V 17/06* (2013.01); *F21V 29/67* (2015.01); *F21V 31/005* (2013.01); *F21V 33/0052* (2013.01); *F21V 29/83* (2015.01)

(58) Field of Classification Search
CPC ........ F21V 29/67; F21V 29/76; F21V 31/005; F21V 33/0052; F21V 17/06
See application file for complete search history.

(56) References Cited

U.S. PATENT DOCUMENTS

| | | |
|---|---|---|
| 11,073,271 B1 | 7/2021 | Huang |
| 11,150,520 B2 | 10/2021 | Ina et al. |

(Continued)

FOREIGN PATENT DOCUMENTS

| | | |
|---|---|---|
| CN | 101806417 A | 8/2010 |
| CN | 204611459 U | 9/2015 |
| CN | 212135117 U | 12/2020 |

(Continued)

OTHER PUBLICATIONS

The First Office Action and Search Report dated Jan. 13, 2022, for Aputure Imaging Industries Co., Ltd., from China Application No. 202111478171.1. and Its translation (13 Pages).

*Primary Examiner* — Thomas M Sember
(74) *Attorney, Agent, or Firm* — Mark M. Friedman

(57) ABSTRACT

A film and television lamp is provided by embodiments of the present disclosure, comprising: a housing assembly, wherein the housing assembly is provided with a cavity, the housing assembly comprises a first housing, the first housing comprises a first ventilation area, a second ventilation area and shelter structure between the first ventilation area and the second ventilation area; a circuit board assembly, wherein the circuit board assembly is provided in the cavity and in correspondence with the shelter structure; a heat dissipating assembly, wherein the heat dissipating assembly is provided in the cavity, and the heat dissipating assembly comprises a first radiator and a second radiator, the first radiator is connected with the second radiator. The present disclosure aims to solve technical problems in the prior art that heat dissipation and waterproof in the film and television lamp cannot be both achieved.

20 Claims, 13 Drawing Sheets

(51) Int. Cl.
    *F21V 31/00*    (2006.01)
    *F21V 33/00*    (2006.01)

(56) References Cited

U.S. PATENT DOCUMENTS

2010/0315813 A1    12/2010  Fugerer et al.
2018/0003370 A1*  1/2018  Mandlekar .............. F21V 15/01

FOREIGN PATENT DOCUMENTS

| | | |
|---|---|---|
| CN | 213040403 U | 4/2021 |
| CN | 113253524 A | 8/2021 |
| CN | 213207745 U | 5/2022 |

\* cited by examiner

FILM AND TELEVISION LAMP

CROSS-REFERENCE TO RELATED APPLICATION

The present application claims priority to Chinese patent application No. 202111478171.1, titled "FILM AND TELEIVSION LAMP", and filed on Dec. 6, 2021, entire contents of which are incorporated herein by reference.

FIELD OF INVENTION

The present disclosure relates to a lighting device field, in particularly to a film and television lamp.

BACKGROUND OF INVENTION

A film and television lamp is an auxiliary device for film and television shooting, video shooting or advertising shooting, and is used to light shot objects or scenes. With increase of shooting scenes and improvement of functions of the film and television lamp, power of the film and television lamp is further increasing, and a number and power of required light source protection assemblies required are increased accordingly. Therefore, a number of circuit boards such as drive boards or control boards needs to be increased as well, which leads to a large amount of heat generated by the film and television lamp when working.

However, due to fickle scenes of scene shooting, lighting needs to face a variety of complex environments, such as a rain environment. In order to ensure that lighting equipment can work in the rain environment, when designing high-power lighting equipment, it should be further considered that external debris such as rainwater is not easy to affect the lighting equipment. Due to heat emission caused by high power and complex environment factors such as rainwater, existing equipment often needs to choose one of heat emission caused by high power and complex environment factors such as rainwater to work for, and cannot work for both heat dissipating and waterproof well.

SUMMARY OF INVENTION

An objective of the present disclosure is to provide a film and television lamp, which aims to solve a technical problem in the prior art that heat dissipation and waterproof in the film and television lamp cannot be both taken into consideration.

In order to solve the above technical problem, the present disclosure provides a film and television lamp, comprising:

a housing assembly, provided with a cavity, wherein the housing assembly includes a first housing, the first housing includes a first ventilation area, and a second ventilation area and a shelter structure between the first ventilation area and the second ventilation area;

a circuit board assembly provided in the cavity and in correspondence with the shelter structure; and a heat dissipating assembly, provided in the cavity, wherein the heat dissipating assembly includes a first radiator and a second radiator, the first radiator is connected with the second radiator, and the circuit board assembly is connected with a side of the second radiator in face to the first radiator; and the first radiator is provided in correspondence with the first ventilation area, and the second radiator is provided in correspondence with the second ventilation area.

In some embodiments, the first radiator includes a plurality of first fins corresponding to the first ventilation area, and a first gap is formed among the plurality of the first fins, the first ventilation area is connected with the first gap; and the shelter structure includes a first baffle and a skeleton, the first ventilation area is connected with the second ventilation area through the skeleton; and an end of the skeleton extends towards the first ventilation area to form a first entity area, the first entity area is connected with the first baffle, and the first baffle extends towards the plurality of the first fins.

In some embodiments, the first radiator includes a first heat dissipating substrate, a side of the first heat dissipating substrate in face to the second radiator is thermally connected to the circuit board assembly, and a side of the first heat dissipating substrate deviating from the second radiator is provided with the plurality of the first fins; and at least part of the plurality of the first fins include a first segment and a second segment, the first segment is connected with the second segment, a height of the first segment is below than that of the second segment, and the height of the second segment is below than that of another part of the plurality of the first fins in close to the second segment, forming a first concave area; and the film and television lamp further includes a first wind assembly, and at least part of the first wind assembly is provided in the first concave area and connected with the first segment to generate air flow in the first gap.

In some embodiments, the first heat dissipating substrate includes a first end away from the first ventilation area and a second end closed to the first ventilation area, wherein the height of the first segment increases gradually from the first end to the second end.

In some embodiments, the housing assembly further includes: a second housing, connected with the first housing, wherein the second housing is provided with a third ventilation area, the third ventilation area is provided in correspondence with the first wind assembly, and the third ventilation area, the first gap, and the first ventilation area form a first convection channel.

In some embodiments, the second radiator includes a plurality of second fins corresponding to the second ventilation area, and a second gap is formed among the plurality of the second fins, the second ventilation area is connected with the second gap; and the shelter structure further includes a second baffle; another end of the skeleton extends towards the first ventilation area to form a second entity area, the second entity area is connected with the first baffle, and the second baffle extends towards space between the circuit board assembly and the second radiator.

In some embodiments, the housing assembly further includes a third housing, wherein the third housing and the first housing are provided in face to each other; the third housing is provided with a fourth ventilation area, the fourth ventilation area is provided in correspondence with the second radiator, the fourth ventilation area, the second gap and the second ventilation area form a second convection channel; and a second wind assembly is further provided between the fourth ventilation area and the second radiator to generate air flow in the second convection channel.

In some embodiments, a side of the first housing in face to the second radiator further is provided with a third baffle, and the second ventilation area is provided between the second baffle and the third baffle; the second radiator includes a second heat dissipating substrate, the plurality of the second fins includes a third segment and a fourth segment, an end of the third segment is connected with the second heat dissipating substrate, an end of the third segment is connected with an end of the fourth segment, a height of the third segment is below than that of the fourth segment, to form first concave area, and the third baffle extends towards the third segment and partially located in the first concave area.

In some embodiments, the film and television lamp further includes a light source protection assembly, the light source protection assembly is connected with the housing assembly, and provided with a hollow cavity; and a part of the light source is provided in the hollow cavity, and the light source is thermally connected with a side of second heat dissipating substrate deviating from the plurality of the second fins; and the light source protection assembly includes: a sleeve, wherein the hollow cavity is provided in the sleeve; and a cover, wherein the cover is connected with the sleeve; the cover is connected with the housing assembly, and the cover is provided with a channel; a part of the sleeve is contained in the channel and another part of the light source is provided in the channel.

In some embodiments, the circuit board assembly includes: a waterproof cover, wherein the waterproof cover includes a main part, the main part extends towards the first heat dissipating substrate, and is hermetically connected with a side of the first heat dissipating substrate deviating from the plurality of the first fins for enclosing to form a containing cavity; and a circuit board, wherein the circuit board is provided in the containing cavity and is thermally connected with the first heat dissipating substrate.

In some embodiments, the waterproof cover further includes an outer edge part, wherein the outer edge part is connected with the main part and extends outward from the containing cavity, and the outer edge part is connected with the first heat dissipating substrate; and the circuit board assembly further includes waterproof foam, wherein a side of the waterproof foam is fitted to the main part and/or the outer edge part, and another side of the waterproof foam is fitted to a side of the first heat dissipating substrate deviating from the plurality of the first fins.

In some embodiments, the main part is provided with a rubber stopper slot, the circuit board assembly further includes a rubber stopper card and a wire, the rubber stopper card is provided in the rubber stopper slot, an end of the wire is electrically connected with the circuit board, and another end of the wire goes through the rubber stopper card and are electrically connected with the light source, the first wind assembly and the second wind assembly.

In some embodiments, the second radiator further includes fixing side plates provided in face to each other, wherein the fixing side plates are connected with the second heat dissipating substrate; and a hanging ear is provided on the fixing side plates, and a first through hole is provided on the hanging ear; the first radiator is provided with a second through hole, and the first through hole and the second through hole are coaxially provided; and the film and television lamp further includes a fixing part, wherein the first through hole and the second through hole are connected through the fixing part; and extending length of the plurality of the first fins in a third direction is less than that of the plurality of the second fins in the third direction; and direction of interval of the plurality of the first fins is parallel to that of the plurality of the second fins.

The film and television lamp provided by a technical scheme of the present disclosure includes a circuit board assembly, a heat dissipating assembly and a housing assembly. The housing assembly forms a cavity to install the circuit board assembly and the heat dissipating assembly. The heat dissipating assembly includes a first radiator and a second radiator. The first radiator and the second radiator are connected and separated from each other, so that the circuit board assembly can be installed between the first radiator and the second radiator. The first housing structure is provided with a first ventilation area, a second ventilation area and a shelter structure. The first ventilation area corresponds to the first radiator in order to discharge heat absorbed by the first radiator. The second ventilation area corresponds to the second radiator in order to discharge heat absorbed by the second radiator. The shelter structure is provided between the first ventilation area and the second ventilation area. The shelter structure corresponds to the circuit board assembly, and can thus prevent rainwater from directly vertically dropping to the circuit board assembly. After the rainwater drops to the shelter structure, the rainwater is guided to the first ventilation area and the second ventilation area through the shelter structure, so as to meet waterproof requirement, and then when the film and television lamp generates a large amount of heat, heat can be dissipated and water can be proofed.

DESCRIPTION OF DRAWINGS

In order to more clearly illustrate technical solutions in embodiments of the present application or in prior art, accompanying drawings required to be used in description of the embodiments or the prior art will be briefly introduced as follows. It is obvious that drawings in the following description merely illustrate part of embodiments of the present disclosure. Other drawings can be obtained by those skilled in the art based on structure shown in the drawings without creative efforts.

Figure 1:
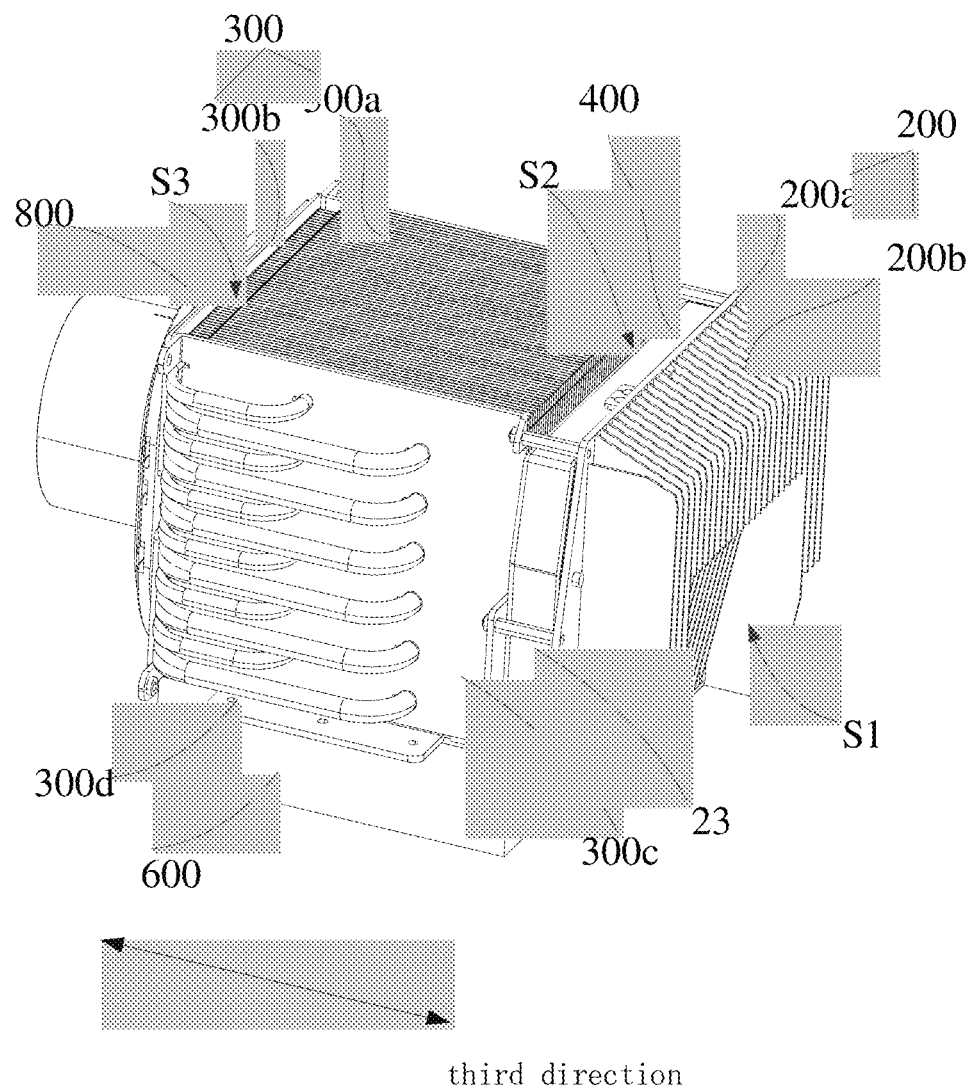
FIG. 1 is a partial schematic diagram of a heat dissipating assembly in the film and television lamp according to an embodiment of the present disclosure.

| Chart tags list | |
|---|---|
| 1 | film and television lamp |
| 100a | first housing |
| 100a-1 | first ventilation area |
| 100a-2 | second ventilation area |
| 100a-3 | shelter structure |
| 100a-3a | first entity area |
| 100a-3b | second entity area |
| 100a-3c | first baffle |
| 100a-3d | second baffle |
| 100a-3e | skeleton |
| 100a-4 | third baffle |
| 100b | second housing |
| 100b-1 | third ventilation area |
| 100b-2 | diversion segment |
| 100c | third housing |
| 100c-1 | fourth ventilation area |
| 100d | fourth housing |
| 200 | first radiator |
| 200a | first heat dissipating substrate |
| 200b | first fin |
| 200b-1 | first segment |
| 200b-2 | second segment |
| 23 | fixing part |
| 300 | second radiator |
| 300a | second fin |
| 300b | second heat dissipating substrate |
| 300c | fixing side plate |
| 300d | fixing panel |
| 400 | circuit board assembly |
| 400a | circuit board |
| 400b | waterproof cover |
| 400b-1 | main part |
| 400b-2 | outer edge part |
| 400c | rubber stopper |
| 500 | first wind assembly |
| 600 | second wind assembly |
| 700 | light source protection assembly |
| 700a | sleeve |
| 700b | cover |
| 700b-1 | first ring connector |
| 700b-2 | second ring connector |
| 800 | light source |
| S1 | first concave area |
| S2 | space |
| S3 | second concave area |

DETAILED DESCRIPTION OF PREFERRED EMBODIMENTS

Technical solutions according to the present application will be clearly and completely described below in conjunction with drawings in the embodiments of the present application. It is obvious that, described embodiments are part of the embodiments of the present application, rather than all of the embodiments. All other embodiments obtained by those ordinarily skilled in the art without creative work based on the embodiments in the present application are within scope of protection of the present application.

It is noted that, all directional instructions in the embodiment of the present disclosure (such as "upper", "lower", "left", "right", "front", "rear" . . . ), are only used to explain a relative position relationship and motion of each component under a specific attitude (as shown in attached figures). If the specific attitude changes, the directional indication further changes accordingly.

In the present disclosure, terms e.g. "connection" and "fix" shall be understood in a broad sense, unless otherwise specified and qualified. For example, "connection" may be fixed connection, detachable connection or integral connection, may be mechanical connection, or electrical connection, may be direct connection or indirect connection through intermediate media, and may be internal connection of two assemblies or interaction between two assemblies, unless otherwise clearly defined. Specific meaning of above terms in the present disclosure can be understood by those ordinarily skilled in the art according to specific circumstances.

Furthermore, if terms e.g. "first", "second" are used in the embodiments o this disclosure, they are for purposes of describing only, and are not to be construed as indicating or implying relative importance, or implicitly indicating a number of technical features indicated. Thus, features defined as "first", "second" may explicitly or implicitly include one or more of the features. In addition, meaning of "and/or" in a full text includes three parallel schemes. Taking "A and/or B" as an example, the three parallel schemes include scheme A, or scheme B, or schemes A and B simultaneously satisfied. In addition, technical scheme of each embodiment can be combined with each other based on realization of those ordinarily skilled in the art. When contradiction occurs in combination of technical schemes or the combination cannot be realized, it should be considered that the combination of technical scheme does not exist, nor is it within a protection scope claimed by the present invention.

The film and television lamp is a kind of film and television lamp used to supplement light to shot objects, and can be used in a plurality of scenes, such as outdoors. With improvement of functions of the film and television lamp, power of the film and television lamp increases, so a light source protection assembly and a circuit board of the film and television lamp will generate a lot of heat, and it is necessary to discharge heat generated in the film and television lamp. However, when shooting in an outdoor rainy day, a ventilation area on a housing of the film and television lamp is connected with an interior of the film and television lamp, so that rainwater enters the housing through the ventilation area, and then may wet the light source protection assembly and the circuit board, resulting damage to the film and television lamp.

In order to overcome the above technical problem. embodiments of the present disclosure provides a film and television lamp, especially a high-power film and television lamp, which can not only ensure that the film and television lamp works within a normal temperature range, tut also effectively avoid rainwater from entering a circuit board, so that the film and television lamp can work normally in rainwater environment.

Figure 6:
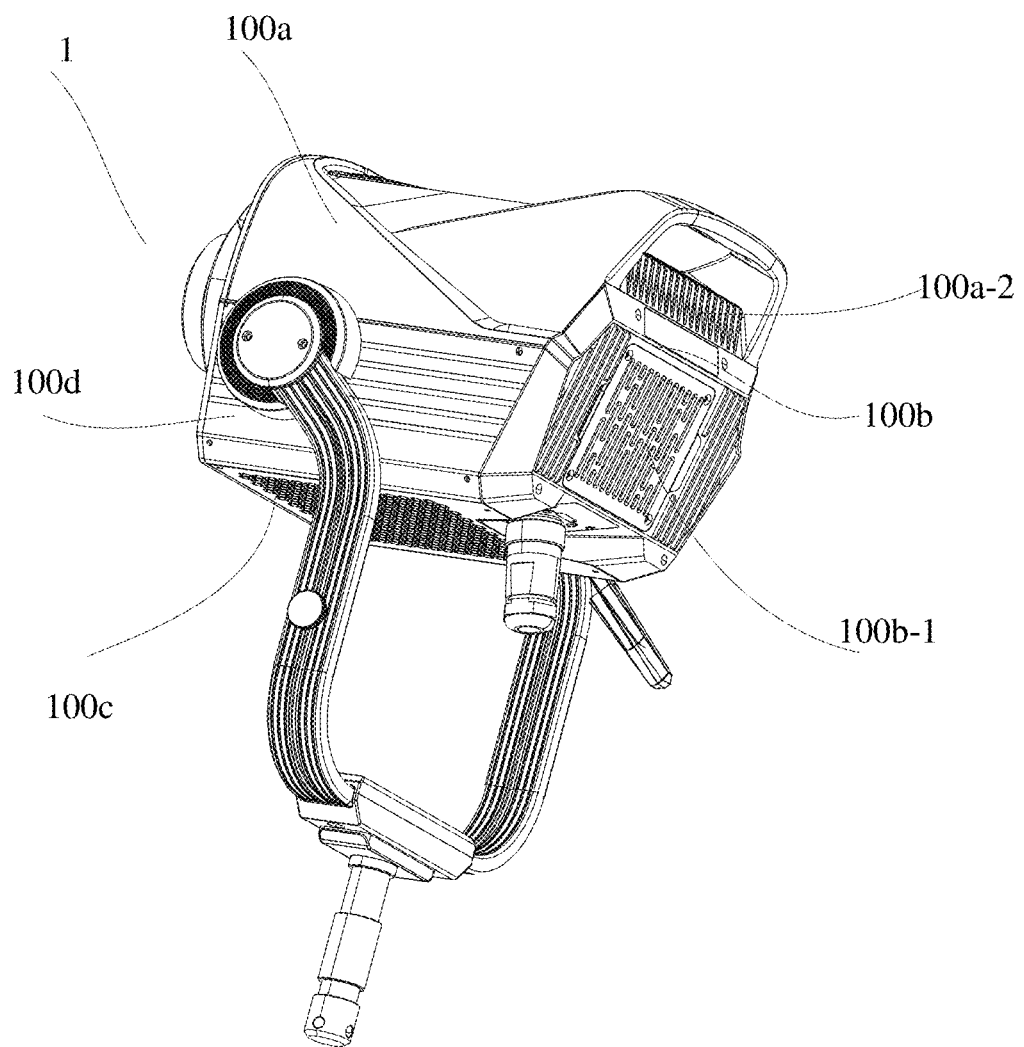
FIG. 6 is an optimized structural schematic diagram of the film and television lamp according to an embodiment of the present disclosure.

Specifically, in the present embodiment, as shown in FIGS. 1 and 6, the film and television lamp 1 includes a circuit board assembly 400, a heat dissipating assembly and a housing assembly. It is further noted that the film and television lamp 1 further includes a light source 800. The circuit board assembly 400 includes a circuit board. The circuit board mainly controls using states of electrical equipment of the film and television lamp 1. The electrical equipment mainly includes the light source 800 and a wind assembly. The circuit board assembly 400 is connected with the light source 800 and the wind assembly through wires, respectively. The heat dissipating assembly mainly discharge heat of the circuit board assembly 400 and the light source 800. The housing assembly can provide installation space for the heat dissipating assembly, the light source 800 and the circuit board assembly 400.

The housing assembly can include a plurality of different housings to form a cavity to install the circuit board assembly 400 and the heat dissipating assembly. In an optional embodiment of the present disclosure, as shown in FIG. 6, the housing assembly includes a first housing 100*a*, a second housing 100*b*, a third housing 100*c* and a fourth housing 100*d*. The first housing 100*a*, the second housing 100*b*, the third housing 100*c* and the fourth housing 100*d* enclose to form a cavity. In different embodiments, the housing assembly can further be formed by housings with other structure.

The heat dissipating assembly includes a first radiator 200 and a second radiator 300. The first radiator 200 is thermally connected with the circuit board assembly 400 to discharge heat of the circuit board; the second radiator 300 is thermally connected with a light source protection assembly to discharge heat of the light source 800. In an optional embodiment, in order to design the film and television lamp 1 to occupy as small space as possible and to meet waterproof requirement, the light source 800, the second radiator 300, the circuit board assembly 400 and the first radiator 200 are arranged in turn along a third direction (connection direction of the first radiator 200 and the second radiator 300). That is, the first radiator 200 and the second radiator 300 are provided at intervals, so that the circuit board assembly 400 can be installed between the first radiator 200 and the second radiator 300. Therefore, it can be understood that the second radiator 300 can further indirectly discharge heat of the circuit board assembly 400.

In order to be in correspondence with layout structure of the radiator, and prevent rainwater from dropping directly to the circuit board assembly 400, the first housing 100*a* is constructed with a first ventilation area 100*a*-1, a second ventilation area 100*a*-2 and a shelter structure 100*a*-3. Similarly, the first ventilation area 100*a*-1, the shelter structure 100*a*-3 and the second ventilation area 100*a*-2 on the first housing 100*a* are provided along the third direction in turn. The first ventilation area 100*a*-1 is in correspondence with the first radiator 200 in order to discharge heat absorbed by the first radiator 200; in general, the first ventilation area 100*a*-1 is constructed with a plurality of heat dissipating holes with intervals between neighboring two of them. The heat dissipating holes can be strip, circular or other shaped. The second ventilation area 100*a*-2 is in correspondence with the second radiator 300 in order to discharge heat absorbed by the second radiator 300. The second ventilation area 100*a*-2 is constructed with a plurality of interval heat dissipating holes with intervals between neighboring two of them, which can be strip, circular or other shapes. The shelter structure 100*a*-3 is an entity area constructed between the first ventilation area 100*a*-1 and the second ventilation area 100*a*-2. The shelter structure 100*a*-3 is in correspondence with the circuit board assembly 400, and specifically, an orthographic projection of the circuit board assembly 400 on the first housing 100*a* falls into a range of the shelter structure 100*a*-3, to prevent rainwater from dropping directly vertically to the circuit board assembly 400. After dropping to the sheltered structure 100*a*-3, the rainwater is guided to the first ventilation area 100*a*-1 and the second ventilation area 100*a*-2 through the sheltered structure 100*a*-3, so as to meet waterproof requirement, so that when a large amount of heat is generated by the film and television lamp 1, heat can be dissipated and water can be proofed.

Figure 9:
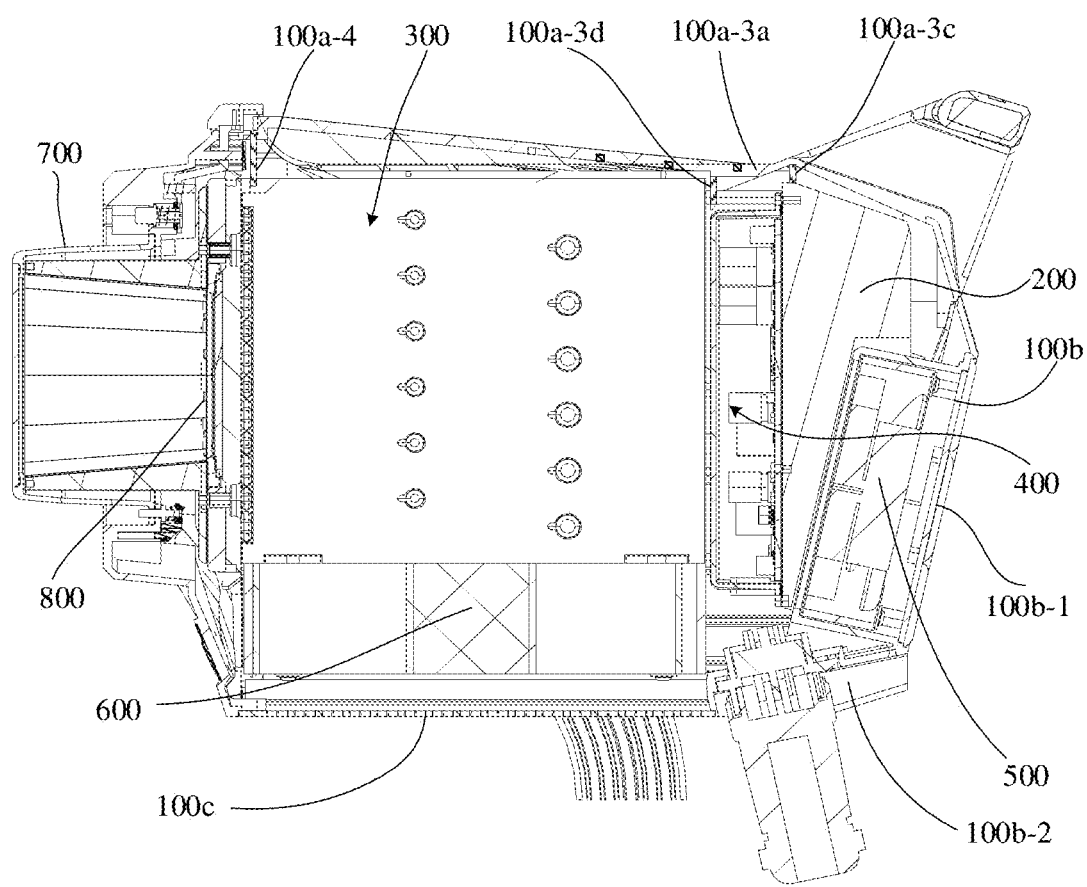
FIG. 9 is a profile schematic diagram of the film and television lamp according to an embodiment of the present disclosure.

As an optional implementation of the above embodiment, according to FIG. 1 and FIG. 9, the first radiator 200 includes a plurality of first fins 200*b* in correspondence with the first ventilation area 100*a*-1, a first gap is formed among the plurality of the first fins 200*b*, the first ventilation area 100*a*-1 is connected with the first gap, in order to form part of a first convection channel. The first ventilation area 100*a*-1 in correspondence with the first radiator 200 means that, an orthographic projection of the first gap formed by at least part of the plurality of the first fins 200*b* of the first radiator 200 on the first housing 100*a* falls into the first ventilation area 100*a*-1, and the first ventilation area 100*a*-1 is connected with the first gap, so that the plurality of the first fins 200*b* and the first ventilation area 100*a*-1 form a part of the first convection channel. The plurality of the first fins 200*b* are provided with good thermal conductivity. The plurality of the first fins 200*b* are provided on a side of a first heat dissipating substrate 200*a* deviating from the circuit board assembly 400. For example, the plurality of the first fins 200*b* can be welded, plugged, riveted and screwed on the first heat dissipating substrate 200*a*, and the plurality of the first fins 200*b* can further be integrally formed with the first heat dissipating substrate 200*a*. The first heat dissipating substrate 200*a* transfers heat to the plurality of the first fins 200*b*. When air flows in intervals between neighboring first fins 200*b*, heat can be taken out of the second radiator 300, to achieve effect of heat dissipating in the circuit board assembly 400.

As illustrated in FIG. 1, FIG. 2, FIG. 3, FIG. 8 and FIG. 9, the shelter structure 100*a*-3 includes a first baffle 100*a*-3*c* and a skeleton 100*a*-3*e*, and the first ventilation area 100*a*-1 is connected with the second ventilation area 100*a*-2 through the skeleton 100*a*-3*e*; and an end of the skeleton 100*a*-3*e* extends towards the first ventilation area 100*a*-1 to form a first entity area 100*a*-3*a*, the first entity area 100*a*-3*a* is connected with the first baffle 100*a*-3*c*, and the first baffle 100*a*-3*c* extends towards the plurality of the first fins 200*b*. The skeleton 100*a*-3*e* is a part of structure of the first housing 100*a*, includes the first entity area 100*a*-3*a* extending towards the first ventilation area 100*a*-1, and is connected with the first ventilation area 100*a*-1, in order to guide water to the first ventilation area 100*a*-1 to discharge through the first gap.

Figure 2:
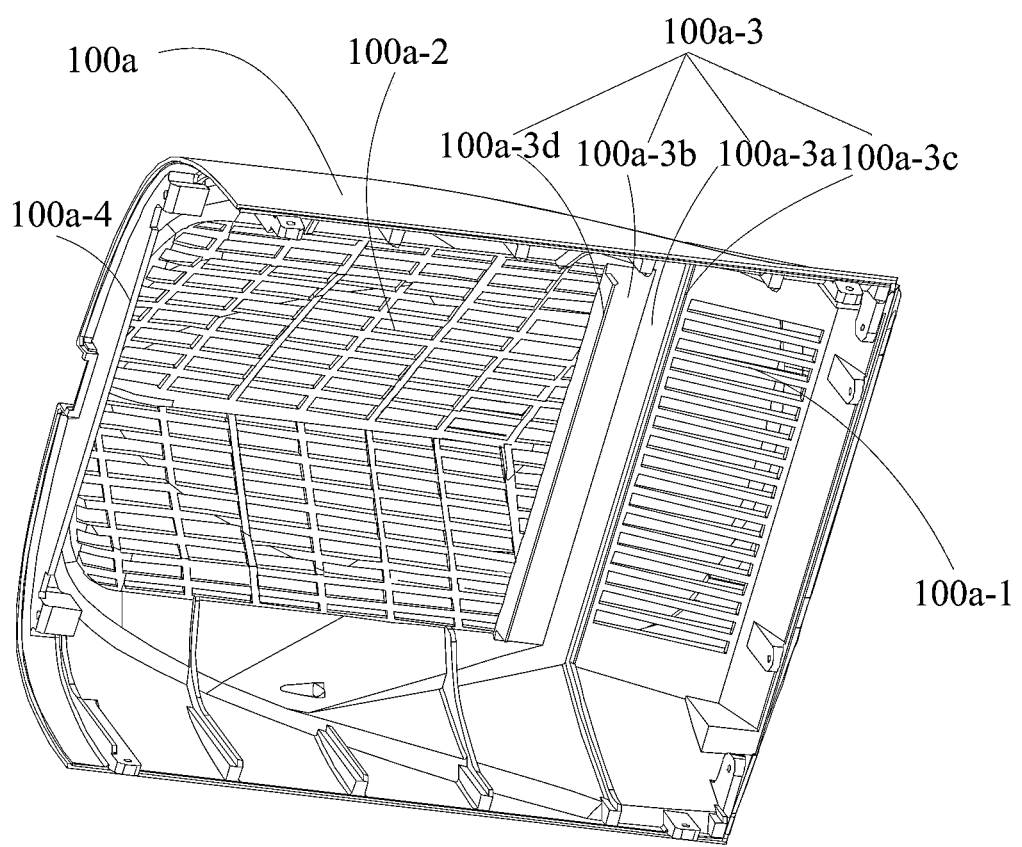
FIG. 2 is a structural schematic diagram of a first housing in the film and television lamp in a first perspective according to an embodiment of the present disclosure.
Figure 3:
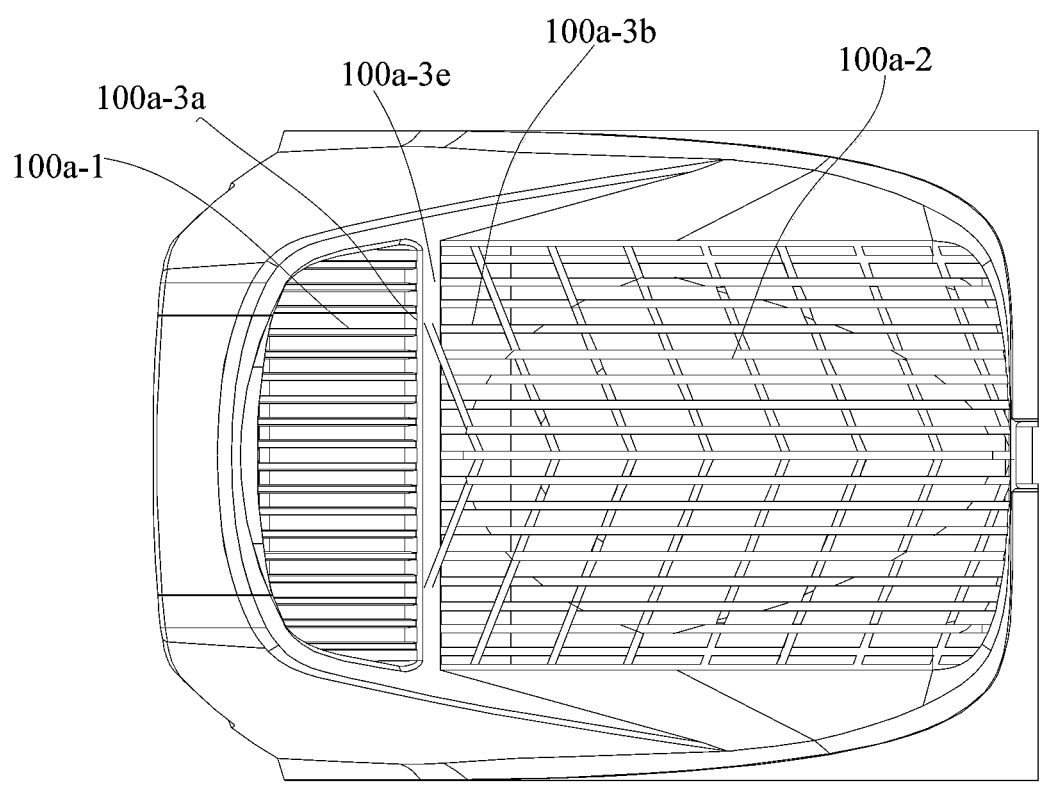
FIG. 3 is a schematic diagram of a first housing in the film and television lamp in a second perspective according to an embodiment of the present disclosure.

In order to effectively avoid water outside the first housing 100*a* from entering the circuit board assembly 400, the shelter structure 100*a*-3 is further provided with a first baffle 100*a*-3*c* extending to the plurality of the first fins 200*b*. As shown in FIG. 2, FIG. 3 and FIG. 9, the first baffle 100*a*-3*c* guides water to intervals among the plurality of the first fins 200*b* of the first radiator 200, and can thus effectively avoid the water flowing along the third direction into the circuit board assembly 400. Specifically, an extending direction of the first baffle 100*a*-3*c* is vertical to the third direction. The first baffle 100*a*-3*c* can be formed by bending from an end of the first baffle 100*a*-3*c* towards the plurality of the first fins 200*b*, or can be fixed on the shelter structure 100*a*-3. In general, an extending direction of the first baffle 100*a*-3*c* is provided in parallel with a side having the plurality of the first fins 200*b* of the first heat dissipating substrate 200*a*. The first baffle 100*a*-3*c* can butt with the plurality of the first fins 200*b*, and some interval can be formed between the first baffle 100*a*-3*c* and the plurality of the first fin 200*b* (the interval can facilitate assembly of the first housing 100*a*).

Figure 4:
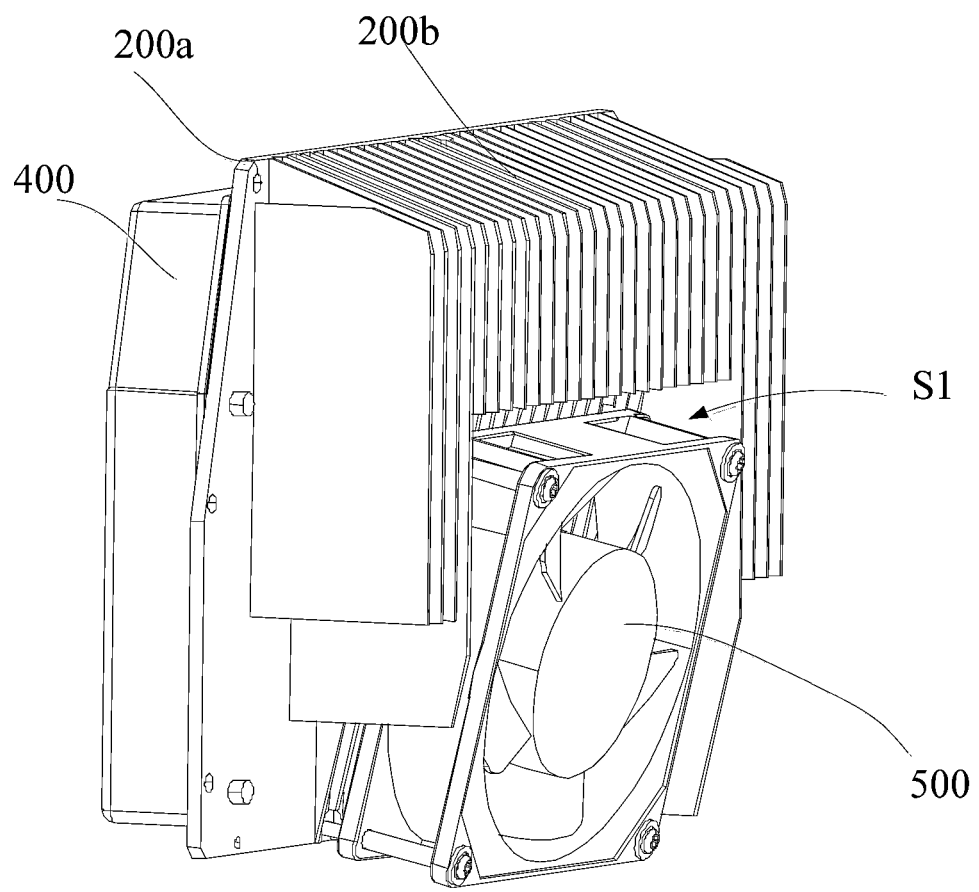
FIG. 4 is a schematic diagram of an assembly structure of a first radiator and a first wind assembly in the film and television lamp according to an embodiment of the present disclosure.

As optional implementation of above embodiment, as shown in FIG. 1 and FIG. 4, the first radiator 200 includes the first heat dissipating substrate 200*a*. The first heat dissipating substrate 200*a* has good thermal conductivity, and is generally constructed as plate-like structure and thermally connected with the circuit board assembly 400.

For example, a surface in a side of the first heat dissipating substrate 200a contacts with a surface of the circuit board assembly 400, so that heat generated by the circuit board assembly 400 is transferred to the first heat dissipating substrate 200a. In general, a contacting surface of the first heat dissipating substrate 200a with the circuit board assembly 400 is a plane; of course, it can also be a curved or irregular surface.

In order to fix the circuit board assembly 400 between the first radiator 200 and the second radiator 300, the circuit board assembly 400 is preferably fixedly connected to the first heat dissipating substrate 200a. For example, an outer edge of the first heat dissipating substrate 200a has a plurality of fixing holes, and the circuit board assembly 400 is connected with the first heat dissipating substrate 200a through thread connection.

Figure 10:
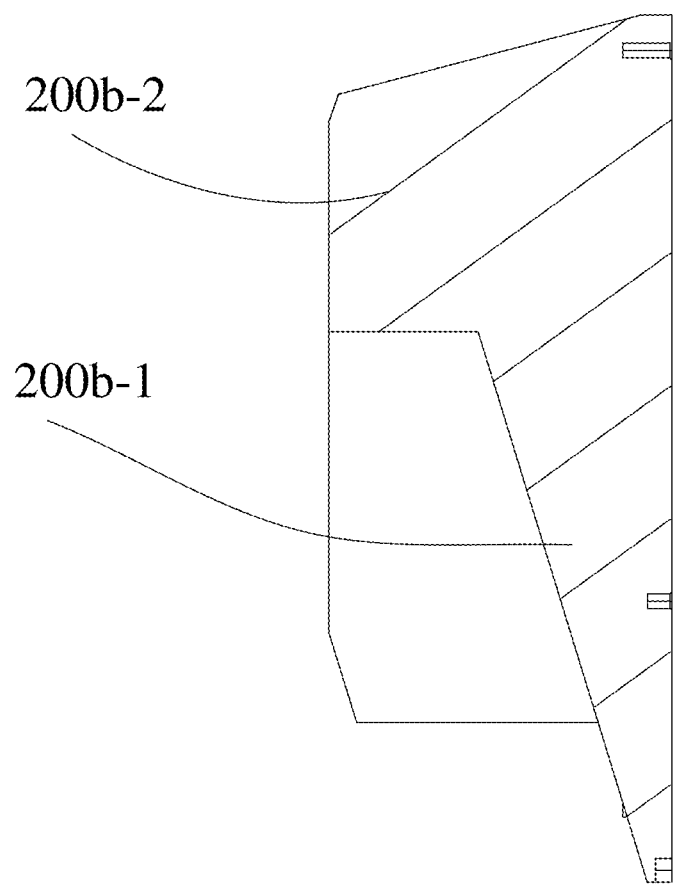
FIG. 10 is an optimized structural schematic diagram of a plurality of first fins according to an embodiment of the present disclosure.

As optional implementation of above embodiment, as shown in FIG. 1 and FIG. 10, at least part of the plurality of the first fins 200b include a first segment 200b-1 and a second segment 200b-2, the first segment 200b-1 is connected with the second segment 200b-2, a height of the first segment 200b-1 is below than that of the second segment 200b-2, and the height of the second segment 200b-2 is below than heights of another part of the plurality of first fins in close to the second segment 200b-2, forming a first concave area S1; and the film and television lamp 1 further includes a first wind assembly 500, and at least part of the first wind assembly 500 is provided in the first concave area S1 and connected with the first segment 200b-1 to generate air flow in the first gap. The first concave area S1 is mainly used to install the first wind assembly 500. The first wind assembly 500 is a fan, preferably a waterproof fan. At least part of the first wind assembly 500 is installed in the first concave area S1, and embedded in the plurality of the first fins 200b, in order to improve spatial occupancy rate and reduce volume of a whole machine. An area occupied by the first concave area S1 is determined by a size of the first wind assembly 500. A size of the first wind assembly 500 is determined according to designed heat dissipating capacity.

The first heat dissipating substrate 200a includes a first end away from the first ventilation area 100a-1 and a second end in close to the first ventilation area 100a-1. As shown in FIG. 10, the height of the first segment 200b-1 increases gradually from the first end to the second end. That is, the first concave area S1 is provided on a side of the plurality of the first fins 200b away from the first ventilation area 100a-1, and can thus make air flow in first gaps among most of the plurality of first fins 200b to improve heat exchanging efficiency. And, the plurality of the first fins 200b are obliquely provided in the first concave area S1. The second segment 200b-2 is triangle structure, and its bottom edge is connected with the first heat dissipating substrate 200a, and the plurality of the first fins 200b are provided at intervals, thus forming the first concave area S1 with surrounding other first fins 200b. An installing surface limited by the first concave area S1 forms an intersection angle with the first heat dissipating substrate 200a. In general, the intersection angle is an acute angle. The installing surface is a surface inclined to the first heat dissipating substrate 200a (generally an installed plane). The first concave area S1 is provided obliquely, to form an intersection angle between the first wind assembly 500 and the first ventilation area 100a-1. Thus, velocity of airflow generated by the first wind assembly 500 has a component flowing towards the first ventilation area 100a-1, and can thus guide the airflow upward to the first housing 100a so as to flow from the first housing 100a-1, and flow in a same direction with airflow flowing from the second ventilation area 100a-2, to realize effective flow of airflow.

Figure 5:
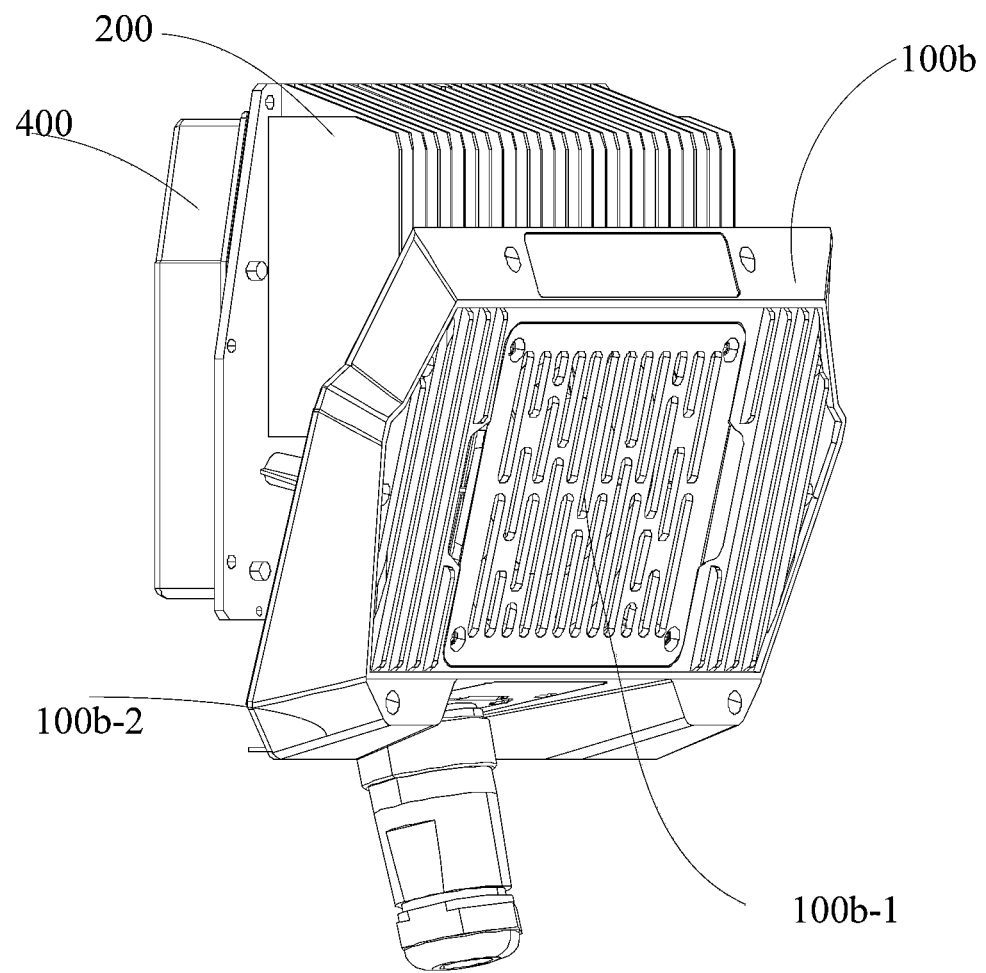
FIG. 5 is a schematic diagram of an assembly structure of a first radiator and a second housing in the film and television lamp according to an embodiment of the present disclosure.

As optional implementation of above embodiment, as shown in FIG. 6 and FIG. 9, the housing assembly further includes: a second housing 100b, wherein the second housing 100b and the first housing 100a are connected. The second housing 100b and the first housing 100a can be connected and/or buckled by a screw fastener. As shown in FIG. 5 and FIG. 6, the second housing 100b and the first housing 100a are inclined to each other. Specifically, an inclining angle of the second housing 100b is provided according to an intersection angle between the first wind assembly 500 and the first heat dissipating substrate 200a. For example, the second housing 100b and the first wind assembly 500 can be provided in parallel. Such design is mainly to make volume of the film and television lamp 1 as small as possible. The second housing 100b is provided with a third ventilation area 100b-1 as an air inlet. The third ventilation area 100b-1 can be formed by honeycomb through-holes, strip through-holes or arrays of a plurality of through-hole.

Further, the third ventilation area 100b-1 is in correspondence with the first wind assembly 500. In general, the third ventilation area 100b-1 is provided right in face to the first wind assembly 500. That is, at least part of orthographic projection of the first wind assembly 500 on the second housing 100b falls into the third ventilation area 100b-1, e.g. all or no less than 80% of orthographic projection falls into the third ventilation area 100b-1, thus allowing sufficient air to enter when the first wind assembly 500 starts. A first convection channel is formed between the third ventilation area 100b-1 and the first ventilation area 100a-1. Space occupied by the first convection channel is mainly limited by the first housing 100a, the second housing 100b, the first heat dissipating substrate 200a and the plurality of first fins 200b. In the embodiments of the present disclosure, from a view of improving effect of heat dissipation and avoiding airflow disorder, the third ventilation area 100b-1 and the first ventilation area 100a-1 are crosswise provided, and thus the first wind assembly 500 is tilted to make the airflow flow towards the first ventilation area 100a-1.

When the first wind assembly 500 starts, external gas enters the film and television lamp 1 from the third ventilation area 100b-1 and flows in space among the plurality of the first fins 200b, to outflow from the first ventilation area 100a-1, to export heat outside from the film and television lamp 1.

Since the second housing 100b is obliquely provided, the rainwater entering the second radiator 300 can fall on the second housing 100b after dropping to the first fin 200b. In order to export such rainwater, as shown in FIG. 9, an end of the second housing 100b deviating from the first housing 100a is bent towards the third housing 100c, forming a diversion segment 100b-2, and guiding the rainwater from the second housing 100b to the third housing 100c, to be exported from the third housing 100c. In addition, the diversion segment is further used to be connected with the third housing 100c to realize reliable connection of the whole machine.

As optional implementation of above embodiment, the second ventilation area 100a-2 is in correspondence with the second radiator 300, which means that, at least part of orthographic projection of a second space among the plurality of the second fins 300a of the second radiator 300 on the first housing 100a falls into the second ventilation area 100a-2, and thus the plurality of the second fins 300a is connected with the second ventilation area 100a-2 to construct a part of a second convection channel.

As an optional implementation of above embodiment, as shown in FIG. 1, space S2 is formed between the second radiator 300 and the circuit board assembly 400. In general, the second radiator 300 is not directly thermally connected with the circuit board assembly 400. That is, in this embodiment, the circuit board assembly 400 is mainly thermally conductive through the first radiator 200. Therefore, the shelter structure 100a-3 of this embodiment has a second baffle 100a-3d extending towards the space S2. On one aspect, it can avoid water directly dropping on the circuit board assembly 400, while on another aspect, it can avoid water from flowing in the third direction. In an embodiment of the present disclosure, when the film and television lamp 1 is used, the first housing 100a is located in upper part, so that the second baffle 100a-3d extends downward. In general, the second baffle 100a-3d can further extends to the space S2, and can further be fitted to at least part of the plurality of the second fins 300a. The second baffle 100a-3d can be integrally formed with the first housing 100a, or can be structure installed on the first housing 100a.

Figure 8:
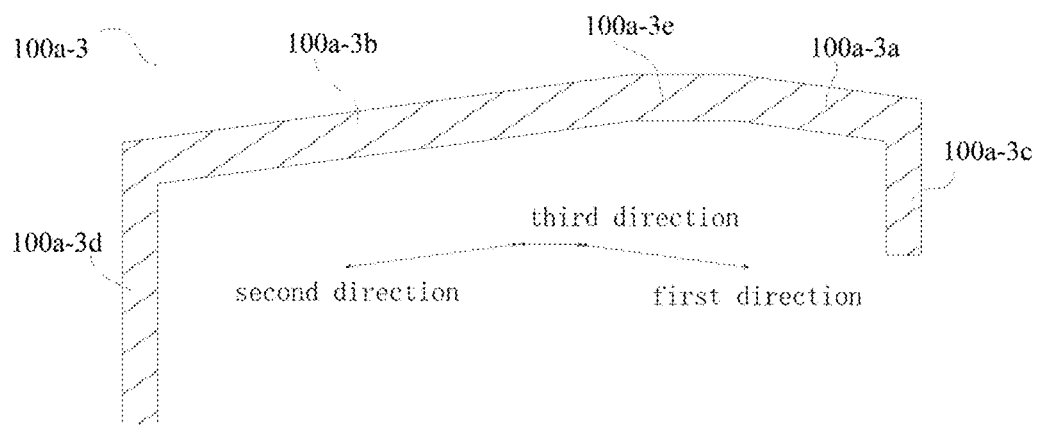
FIG. 8 is an optimized structural schematic diagram of a shelter structure according to an embodiment of the present disclosure.

The shelter structure 100a-3 includes a skeleton 100a-3e, as shown in FIG. 3 and FIG. 8. The skeleton 100a-3e can be a part of the first housing 100a between the first ventilation area 100a-1 and the second ventilation area 100a-2. An end of the skeleton 100a-3e extends along the first direction towards the first radiator 200, to form the first entity area 100a-3a. The first direction and the third direction intersect in the same plane. That is, the shelter structure 100a-3 is inclined to the first ventilation area 100a-1, which is beneficial to guide rainwater to flow into the first radiator 200. Similarly, another end of the skeleton 100a-3e extends towards the second radiator 300 along the second direction, to form the second entity area 100a-3b. The second direction and the third direction intersect in a same plane. That is, the shelter structure 100a-3 is also inclined to the second ventilation area 100a-2, which is beneficial to guide rainwater to flow into the second radiator 300. In general, an intersection angle between the first direction and the third direction, and an intersection angle between the second direction and the third direction can be provided as small as possible. It is OK to ensure that the first direction has slight inclination with the third direction and the second direction has slight inclination with the third direction, to reduce space between the first radiator 200 and the second radiator 300, and facilitate integral molding of the first housing 100a for easy injection molding.

As shown in FIG. 1, the second radiator 300 further includes fixing side plates 300c provided in face to each other, wherein the fixing side plates 300c is connected with the second heat dissipating substrate 300b; a hanging ear is provided on the fixing side plates 300c, wherein first through holes are provided on the hanging ear; the first radiator 200 is provided with second through holes, wherein each of the first through holes and corresponding one of the second through holes are coaxially provided; the film and television lamp 1 further includes a fixing part 23, the fixing part 23 including a first part, a middle part and a second part, the first part being connected with an end of the middle part, the second part being connected with another end of the middle part, the first part being connected with the first through holes, and the second part being connected with the second through holes. In general, a plurality of hanging ears can be provided on the fixing side plates 300c at intervals. The second through holes are generally provided on the first heat dissipating substrate 200a, and in one-to-one correspondence with the first through holes. Moreover, each of the first through holes and corresponding one of the second through holes are coaxially provided with an axis in parallel to the third direction. When the second radiator 300 is fixed to a cavity of the housing assembly, the first radiator 200 can also be fixedly connected to the cavity, to realize that the first radiator 200 and the second radiator 300 are firmly fixed to inner of the housing assembly of the film and television lamp 1.

Further, an outer side of the fixing side plates 300c is connected with a fixing panel 300d, the fixing panel 300d extends towards the fourth housing 100d, and is connected with the fourth housing 100d, so that the second radiator is fixed inside the cavity.

In other embodiments, if power consumption of the light source protection assembly 700 is low, the second radiator 300 can be directly thermally connected with the circuit board assembly 400, and heat is dissipated for the light source protection assembly 700 and the circuit board assembly 400. At a same time, the shelter structure 100a-3 is also provided with the second baffle 100a-3d extending towards the plurality of the second fins 300a, so as to guide rainwater into intervals among the plurality of the second fins 300a. At this time, an end of the second fin 300a can contact with that of the second baffle 100a-3d, to improve waterproof ability.

Figure 11:
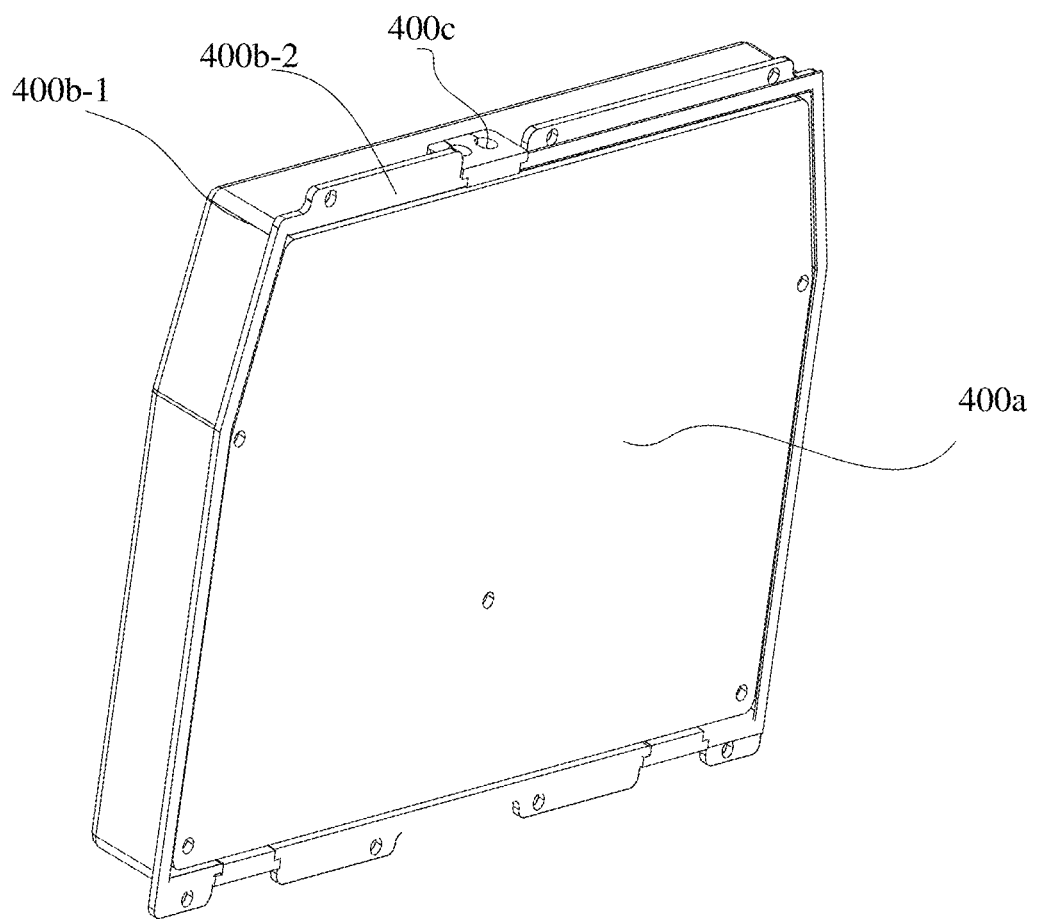
FIG. 11 is an optimized structural schematic diagram of a circuit board assembly according to an embodiment of the present disclosure.

When precipitation is large, waterproof effect of the shelter structure 100a-3 decreases, and some water may enter space occupied by the circuit board assembly 400. As shown in FIG. 11 and FIG. 9, in order to effectively prevent water from entering the circuit board 400a, the circuit board assembly 400 includes a waterproof cover 400b and the circuit board 400a. The waterproof cover 400b includes the main part 400b-1. And the main part 400b-1 extends towards the first heat dissipating substrate 200a and is sealed and connected with a side of the first heat dissipating substrate 200a deviating from the plurality of the first fins 200b, for enclosing to form a containing cavity. The main part 400b-1 forms a cavity with an opening at a certain height. The waterproof cover 400b is connected with the first heat dissipating substrate 200a to form a containment cavity to accommodate the circuit board 400a. And, the circuit board 400a is thermally connected with the first heat dissipating substrate 200a. For example, there is a thermal conductive film between the circuit board 400a and the first heat dissipating substrate 200a, e.g., the circuit board and the first heat dissipating substrate 200a can be bonded on both sides of a thermal conductive silicon film through thermal conductive silicone grease, respectively. For another example, the circuit board 400a and the first heat dissipating substrate 200a are directly connected through thermally conductive silicone. There are one or more first thread holes on the circuit board 400a, and one or more corresponding second thread holes are provided on the first heat dissipating substrate 200a. One of the first thread holes and corresponding one of the second thread holes are connected through a first thread fastener, so that the circuit board 400a is fixedly connected with the first heat dissipating substrate 200a. The waterproof cover 400b is fixed on the first heat dissipating substrate 200a, and waterproof foam is installed at junction of the waterproof cover and the first heat dissipating substrate 200a to prevent water from entering the cavity. The first screw fastener can be screw, stud, etc.

As optional implementation of above embodiment, as shown in FIG. 11, the waterproof cover 400b includes an outer edge part 400b-2, and the outer edge 400b-2 is connected, e.g. integrally connected, with the main part 400b-1. Integral connection is formed by the outer edge part 400b-2 extending from the main part 400b-1 in an outward direction departing from the containment cavity. The outer edge 400b-2 is connected with the first heat dissipating substrate 200a, and thus the waterproof cover is sealed with the first heat dissipating substrate. A side of the main part 400b-1 and/or the outer part 400b-2 in face to the first heat dissipating substrate 200a is fitted to waterproof foam. A side of the waterproof foam deviating from the main part 400b-1 is fitted to the first heat dissipating substrate 200a, to avoid water from flowing into the containing cavity. The main part 400b-1 departs from the containment cavity to extend outward to form the outer part 400b-2. A plurality of third thread holes are constructed on the outer edge part 400b-2, and fourth thread holes are constructed in correspondence on the first heat dissipating substrate 200a. The outer edge part 400b-2 is connected with the first heat dissipating substrate through the second thread fixing part, and the waterproof foam is pressed, so that the first heat dissipating substrate 200a is sealed with the waterproof cover 400b. The second thread fixing parts can be screws, studs, etc.

As shown in FIG. 11, the circuit board assembly 400 further includes rubber stoppers 400c and wires, wherein the rubber stoppers 400c are used to extract the wires within the waterproof cover 400b. The main part 400b-1 is constructed with rubber stopper slots, and the rubber stopper cards 400c are located in the rubber stopper slots and connected with the waterproof cover. Along a circumferential direction of the main part 400b-1 of the waterproof cover 400b, a plurality of the rubber stopper slots are provided at intervals, and the rubber stopper can be stuck in the rubber stopper slots. An end of each of the wires is connected to the circuit board, and each of the wires goes from the containing cavity to a corresponding rubber stopper among the rubber stoppers, to electrically connect the light source 800, the first wind power assembly 500 and the second wind assembly 600 respectively. In general, a number of the rubber stopper slots can be three (in correspondence with the light source 800, the first wind assembly 500 and the second wind assembly 600, respectively).

As optional implementation of above embodiment, as shown in FIG. 1 and FIG. 9, a side the first housing 100a in face to the second radiator 300 is provided with the third baffle 100a-4. The third baffle 100a-4 can be integrally formed with the first housing 100a, or can be inserted into an inner wall of the first housing 100a. There is a second ventilation area 100a-2 between the second baffle 100a-3d and the third baffle 100a-4. For example, opposite sides of the second ventilation area 100a-2 are the second baffle 100a-3d and the third baffle 100a-4, respectively. The third baffle 100a-4 is usually plate structure, which is mainly waterproof for the light source protection assembly 700. The third baffle 100a-4 can avoid water from flowing into the light source protection assembly 700 along the third direction, and thus plays a protective role on the light source protection assembly 700.

Further, the second radiator 300 includes a plurality of second fins 300a, and the plurality of the second fins of 300a have space among each other to form a second convection circulation channel for air flow. In general, the second ventilation area 100a-2 is in correspondence with the plurality of the second fins 300a. That is, at least part of orthographic projection of the plurality of second fins 300a on the first housing 100a falls into the second ventilation area 100a-2. For example, more than 80% of the orthographic projection falls into the second ventilation area 100a-2.

As shown in FIG. 1, the plurality of the second fins 300a include a third segment and a fourth segment. An end of the third segment is connected with the second heat dissipating substrate 300b. An end of the third segment is connected with that of the fourth segment. A height of the third segment is below than that of the fourth segment, to form a second concave area S3. The third baffle extends towards the third segment and is partially located in the second concave area S3. The third baffle 100a-4 is embedded in the second concave area S3. Specifically, the third baffle 100a-4 is embedded in the second concave area S3, and can thus guide water to intervals among the plurality of the second fins 300a, and simultaneously avoid water from flowing along the third direction to a side of the light source protection assembly 700. The second concave area S3 is formed by part of the second fins 300a being lower than another part thereof. As shown in FIG. 1, the concave depth of the second concave area S3 can be determined according to actual needs.

The second radiator 300 usually includes the second heat dissipating substrate 300b, a plurality of heat conduction tubes, the plurality of second fins 300a and the fixing side plates 300c. The fixing side plates 300c are provided at intervals, and direction of the intervals is vertical to the third direction. An end of each of the plurality of second fins 300a is connected with the second heat dissipating substrate 300b and extends along the third direction. The plurality of the second fins 300a are provided at intervals in a direction of intervals of the fixing side plates, to form a plurality of second gaps. Any of the plurality of heat conduction tubes is bent. Each of the plurality of heat conduction tubes includes a first heat conduction segment, a first middle segment, a second heat conduction segment, and a second middle segment and a third heat conduction segment. An end of the first heat conduction segment is connected with the first middle segment, an end of the first middle segment is connected with the second heat conduction segment, an end of the second heat conduction segment is connected with the second middle segment, and the second middle segment is connected with the third heat conduction segment. The first heat conduction segment and the third heat conduction segment are flat and fitted to the second heat dissipating substrate 300b. The first middle segment is outside the fixing side plates 300c, and bends through a through hole on the fixing side plate 300c, to be connected with the second thermal conduction segment; the second thermal conduction segment passes through a corresponding second fin of the plurality of second fins 300a, a corresponding through via among the through vias on another fixing side plates 300c and connects with the second middle segment, wherein the second middle segment is outside another fixing side plates. Compared with existing technologies, the second radiator 300 proposed by the present disclosure occupies a small space, can effectively reduce length of the whole machine, and can avoid interference with the circuit board assemble 400 when installed. Heat conducting tubes can be made of materials with good thermal conductivity such as copper. The plurality of the second fins 300a can be made of materials with good thermal conductivity, such as copper or aluminum. Two fixing side plates 300c are further connected with the housing assemble to install the second radiator 300 inside the film and television lamp 1.

As optional implementation of above embodiment, in consideration of efficiency of heat dissipation and space occupied by the whole machine, extension length of the plurality of first fins 200b in the third direction is smaller than that of the plurality of second fins 300a in the third direction. That is, on the whole, space of the first radiator is less than that of the second radiator, mainly because most of heat of the film and television lamp 1 is generated from heat of the light source, and thus it is not necessary to make the first radiator 200 too large. Direction of the intervals among the plurality of the first fins 200b is parallel to that of the plurality of second fins 300a. That is, when the whole machine dissipates heat, gas flows in a direction to improve efficiency of heat dissipation in whole machine.

Figure 7:
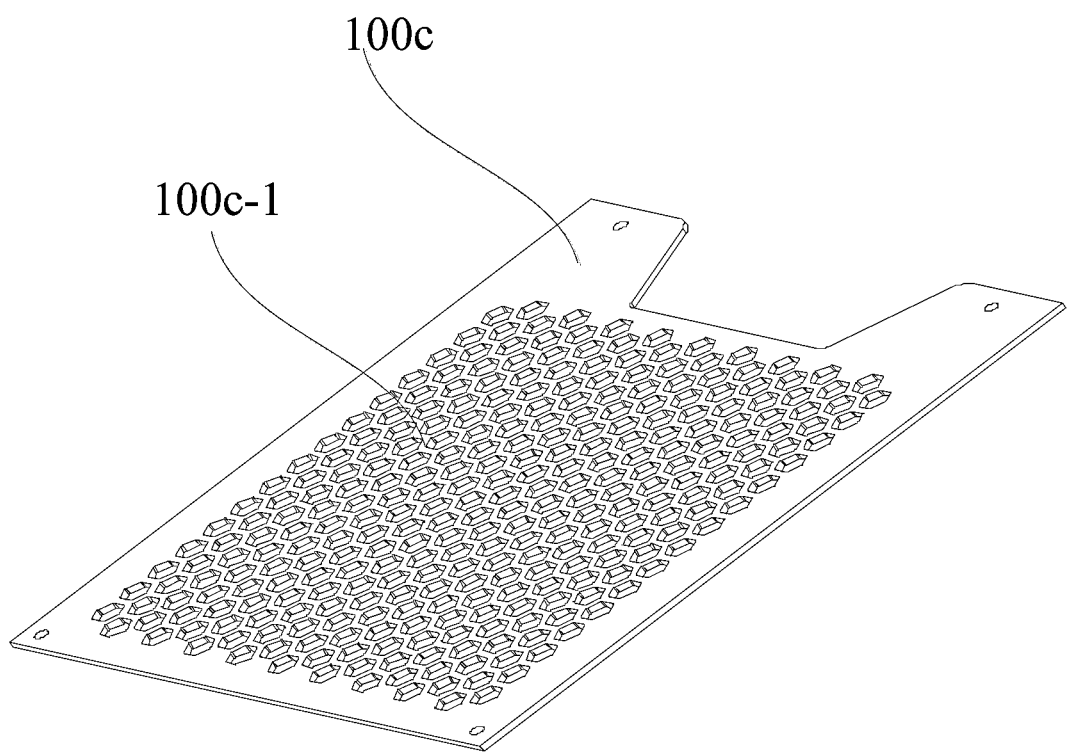
FIG. 7 is an optimized structural schematic diagram of a third housing in the film and television lamp according to an embodiment of the present disclosure.

As optional implementation of above embodiment, the housing assembly further includes the third housing 100c, and the third housing 100c is provided in face to the first housing 100a. Direction of space between the third housing 100c and the first housing 100a and the third direction may be vertical to each other or roughly vertical to each other. The third housing 100c can be directly connected with the first housing 100a or indirectly connected with other housings. The third housing 100c is provided with the fourth ventilation area 100c-1, and the fourth ventilation area 100c-1 can be formed by an array of a plurality of heat dissipating through-holes, as shown in FIG. 7. For example, the array can be a strip or circular or honeycomb network structure. The fourth ventilation area 100c-1 and the second ventilation area 100a-2 form a the second convection channel. In general, the fourth ventilation area 100c-1 is provided in face to the second ventilation area 100a-2. The second radiator 300 is located is between the fourth ventilation area 100c-1 and the second ventilation area 100a-2, and the second wind assembly 600 is located between the fourth ventilation area 100c-1 and the second radiator 300. When the film and television lamp 1 is used, it contains the second ventilation area 100a-2, the second radiator 300, the second wind assembly 600, and the fourth ventilation area 100c-1 from top to bottom.

Fluid can flow in the second convection channel to drain and/or dissipate heat. The second wind assembly 600 can be a fan, especially a waterproof fan. The waterproof fan is fixed on an outer plate, especially on a side of the second radiator 300 in face to the fourth ventilation area 100c-1.

Specifically, the housing assembly further includes the fourth housings 100d. A number of the fourth housings 100d is two, and two fourth housings 100d are connected with corresponding outer plates respectively. The third housing 100c is connected with two fourth housings 100d, e.g. by buckle and/or thread connection, to cover opening area between the fourth housings 100d. Two outer plates are connected with corresponding fourth housings 100d. Two fourth housings 100d are connected with the first housing 100a e.g. by fasteners and/or thread connection. The light source protection assembly 700 is connected with the first housing 100a and the fourth housings 100d, e.g. by buckle and/or thread connection. In state of usage, the light source protection assembly 700 is at a front end (the second housing 100b is at a back end), as shown in FIG. 6.

In embodiments of the present disclosure, length of the first baffle 100a-3c, length of the second baffle 100a-3d and length of the third baffle 100a-4 in face to inner of the film and television lamp 1 can be 5-10 cm. When selecting them, forcing situation should be considered to avoid breaking. The length of the third baffle 100a-4 is limited by depth of the second concave area S3, and the depth will affect connection of the plurality of the second fins 300a. Moreover, the second heat dissipating substrate 300b of the second radiator 300 has certain protective effect on water retaining as well, so the length of the third baffle 100a-4 should not be too large.

As optional implementation of above embodiment, as shown in FIG. 9, the film and television lamp 1 further includes light source 800. As the light part of the film and television lamp 1, the light source 800 will produce a lot of heat. Therefore, the second radiator 300 further includes the second heat dissipating substrate 300b. The second heat dissipating substrate 300b is thermally connected with the light source 800. For example, the second heat dissipating substrate 300b can be connected in close to a substrate of the light source 800 through thermal conductive silicone. Of course, in order to improve thermal conductivity, thermal conductive plates, e.g. thermal conductive plates made of copper, graphene and other materials can further be provided between the second heat dissipating substrate 300b and the substrate of the light source 800. In general, the light source 800 is located on a side of the second heat dissipating substrate 300b deviating from the plurality of the second fins 300a. When the third baffle 100a-4 is embedded in the second concave area S3, the third baffle 100a-4 can be fitted or staggered to a side of the second heat dissipating substrate 300b deviating from the light source 800, and to be effectively waterproof.

Figure 12:
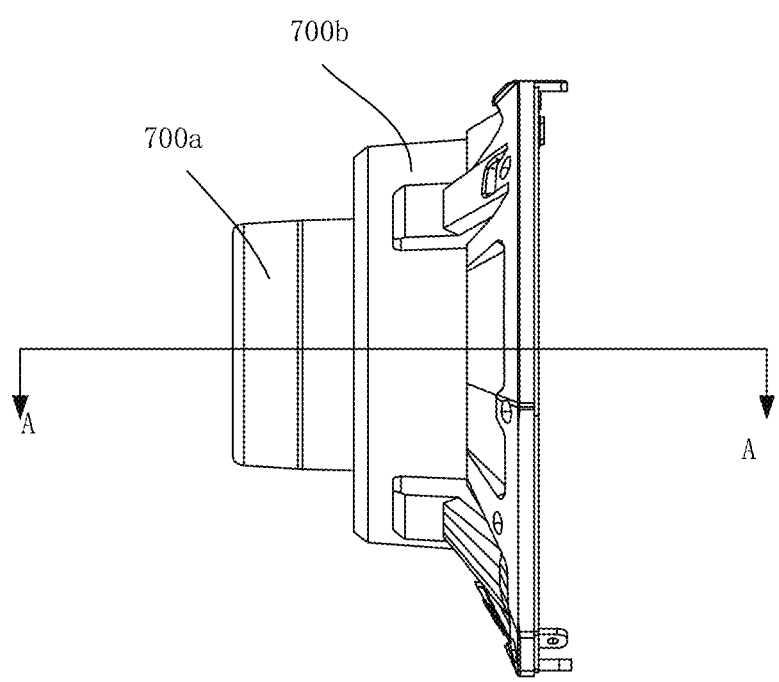
FIG. 12 is an optimized structural schematic diagram of a light source protection assembly according to an embodiment of the present disclosure.
Figure 13:
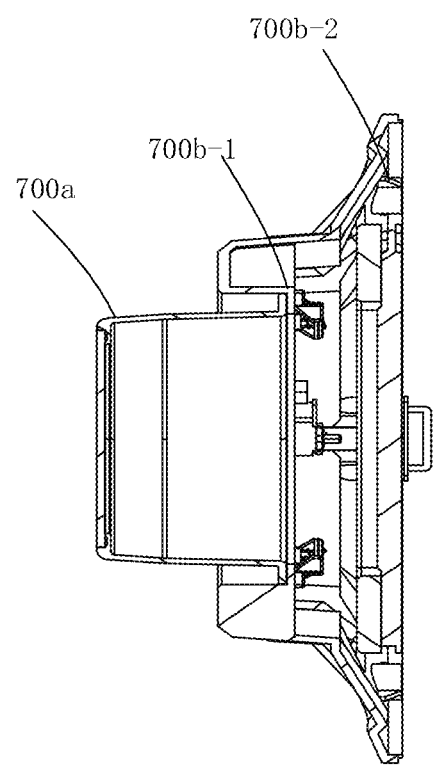
FIG. 13 is an optimized schematic diagram of A-A section according to FIG. 12.

As optional implementation of above embodiment, as shown in FIG. 12 and FIG. 13, the light source protection assembly 700 includes a sleeve 700a and a cover 700b; the cover 700b has a channel with openings at both ends of its axial direction; part of the sleeve 700a is located outside the channel and another part thereof is located inside the channel. The sleeve 700a is fixed in the channel. The cover 700b includes the first ring connector 700b-1 and the second ring connector 700b-2. The second ring connector 700b-2 is provided outside the first ring connector 700b-1. An inner surface of the second ring connector 700b-2 is provided in a presupposed intersection angle with a peripheral surface of the first ring connector 700b-1. A first end of the first ring connector 700b-1 is fixedly connected with a first end of the second ring connector 700b-2. The sleeve 700a includes a main body of the sleeve 700a and a back end plate of the sleeve 700a, and the back end plate of the sleeve 700a is fixedly connected with the main body of the sleeve 700a, and is provided in periphery of the main body of the sleeve 700a; a second end of the second ring connector 700b-2 is fixedly connected with an end of the housing assembly, e.g. the second end of the second ring connector 700b-2 is connected with the first housing 100a and the fourth housing 100d; the second end of the first ring connector 700b-1 tightens the back end plate of the sleeve 700a against an end of the housing. A hollow cavity is provided in sleeve 700a. A luminescent part of the light source is located in the hollow cavity, and a matrix part of the light source 800 is located outside the hollow cavity and in the channel. There are a plurality of fixing blocks on the matrix part, and there are a plurality of fifth thread holes on the fixing blocks. The fixing blocks are provided along an axial interval of the matrix part at interval. The sleeve 700a has sixth thread holes provided at interval along its axial direction. One of the plurality of fifth thread holes and corresponding one of the plurality of sixth thread holes are connected through a third thread fastener, so that the light source is fixedly connected with the sleeve 700a. At least part of the light source 800 is provided in the hollow cavity and another part of the light source 800 is provided in the channel, and is thermally connected with a side of the second heat dissipating substrate 300b departing from the plurality of the second fins.

Further, a side of the sleeve 700*a* departing from the light source is connected with a light transmittance element, which emits light from the light source outside the film and television lamp 1.

Above implementations are only optional embodiments of the present disclosure, and do not limit patent scope of the present disclosure. Equivalent structural transformation made by using description and drawings of the present disclosure or application of description and drawings of the present disclosure in other related technical fields under invention conception of the present disclosure are included in patent protection scope of the present disclosure.

What is claimed is:

1. A film and television lamp, comprising:
    a housing assembly, wherein, the housing assembly is provided with a cavity; and the housing assembly comprises a first housing, the first housing comprises a first ventilation area, and a second ventilation area and a shelter structure between the first ventilation area and the second ventilation area;
    a circuit board assembly, wherein, the circuit board assembly is provided in the cavity and in correspondence with the shelter structure;
    a heat dissipating assembly, wherein, the heat dissipating assembly is provided in the cavity; and the heat dissipating assembly comprises a first radiator and a second radiator, the first radiator is connected with the second radiator, and the circuit board assembly is connected with a side of the second radiator in face to the first radiator; and
    the first radiator is provided in correspondence with the first ventilation area, and the second radiator is provided in correspondence with the second ventilation area; and
    a light source, wherein the light source is thermally connected with the first radiator,
    the film and television lamp further comprises a first wind assembly and a second wind assembly, wherein the first wind assembly is disposed at a side surface of the first radiator away from the second radiator and connected with the first radiator to provide air flow for the first radiator, and the second wind assembly is disposed below the second radiator and connected with the second radiator to provide air flow for the second radiator.

2. The film and television lamp according to claim 1, wherein, the first radiator comprises a plurality of first fins corresponding to the first ventilation area, a first gap is formed among the plurality of first fins, and the first ventilation area is connected with the first gap; and
    the shelter structure comprises a first baffle and a skeleton, and the first ventilation area is connected with the second ventilation area through the skeleton; and an end of the skeleton extends towards the first ventilation area to form a first entity area, the first entity area is connected with the first baffle, and the first baffle extends towards the plurality of the first fins.

3. The film and television lamp according to claim 2, wherein, the first radiator comprises a first heat dissipating substrate, a side of the first heat dissipating substrate in face to the second radiator is thermally connected to the circuit board assembly, and a side of the first heat dissipating substrate deviating from the second radiator is provided with the plurality of the first fins; and
    at least part of the plurality of the first fins comprise a first segment and a second segment, forming a first concave area; and
    at least part of the first wind assembly is provided in the first concave area and connected with the first segment to generate air flow in the first gap.

4. The film and television lamp according to claim 3, wherein, the first heat dissipating substrate comprises a first end away from the first ventilation area and a second end closed to the first ventilation area;
    wherein, the height of the first segment increases gradually from the first end to the second end.

5. The film and television lamp according to claim 4, wherein, the housing assembly further comprises:
    the second housing, wherein, the second housing is connected with the first housing; and
    the second housing is provided with a third ventilation area, the third ventilation area is provided in correspondence with the first wind assembly, the third ventilation area, the first gap, and the first ventilation area form a first convection channel.

6. The film and television lamp according to claim 5, wherein, the housing assembly comprises a third housing and a fourth housing, and the first housing, the second housing, the third housing and the fourth housing enclose to form a cavity in order to install the circuit board assembly and the heat dissipating assembly.

7. The film and television lamp according to claim 6, wherein, an end of the second housing deviating from the first housing is bent towards the third housing, forming a diversion segment.

8. The film and television lamp according to claim 3, wherein, the circuit board assembly comprises a waterproof cover, and the waterproof cover comprises a main part, wherein, the main part extends towards the first heat dissipating substrate, and the main part is hermetically connected with a side of the first heat dissipating substrate deviating from the plurality of the first fins to form a containing cavity; and
    a circuit board, wherein, the circuit board is provided in the containing cavity and is thermally connected with the first heat dissipating substrate (200*a*).

9. The film and television lamp according to claim 8, wherein, the waterproof cover further comprises an outer edge part, the outer edge part is connected with the main part and extending outward from the containing cavity, and the outer edge part is connected with the first heat dissipating substrate; and
    the circuit board assembly further comprises waterproof foam, a side of the waterproof foam is fitted to the main part, and another side of the waterproof foam is fitted to a side of the first heat dissipating substrate deviating from the plurality of the first fins.

10. The film and television lamp according to claim 9, wherein, the main part comprises a rubber stopper slot, the circuit board assembly further comprises a rubber stopper card and a wire, the rubber stopper card is provided in the rubber stopper slot, an end of the wire is electrically connected with the circuit board, and another end of the wire goes through the rubber stopper card and are electrically connected with the light source, the first wind assembly and the second wind assembly.

11. The film and television lamp according to claim 8, wherein, the waterproof cover further comprises an outer edge part, the outer edge part is connected with the main part and extending outward from the containing cavity, and the outer edge part is connected with the first heat dissipating substrate; and the circuit board assembly further comprises waterproof foam, a side of the waterproof foam is fitted to the outer edge part, and another side of the waterproof foam is fitted to a side of the first heat dissipating substrate deviating from the plurality of the first fins.

12. The film and television lamp according to claim 8, wherein, the waterproof cover further comprises an outer edge part, the outer edge part is connected with the main part and extending outward from the containing cavity, and the outer edge part is connected with the first heat dissipating substrate; and the circuit board assembly further comprises waterproof foam, a side of the waterproof foam is fitted to the main part and the outer edge part, and another side of the waterproof foam is fitted to a side of the first heat dissipating substrate deviating from the plurality of the first fins.

13. The film and television lamp according to claim 3, wherein, an extending direction of the first baffle is provided in parallel with a side provided with the plurality of the first fins 200b of the first heat dissipating substrate.

14. The film and television lamp according to claim 2, wherein, the second radiator comprises a plurality of second fins corresponding to the second ventilation area, a second gap is formed among the plurality of the second fins, and the second ventilation area is connected with the second gap;

the shelter structure further comprises a second baffle; another end of the skeleton extends towards the first ventilation area to form a second entity area, the second entity area is connected with the first baffle, and the second baffle extends towards space between the circuit board assembly and the second radiator; and the housing assembly further comprises the third housing, and the third housing and the first housing are provided in face to each other;

the third housing is provided with a fourth ventilation area, the fourth ventilation area is provided in correspondence with the second radiator, and the fourth ventilation area, the second gap and the second ventilation area form a second convection channel; and the second wind assembly is further provided between the fourth ventilation area and the second radiator to generate air flow in the second convection channel.

15. The film and television lamp according to claim 14, wherein, a side of the first housing in face to the second radiator further is provided with a third baffle, and the second ventilation area is provided between the second baffle and the third baffle; and the second radiator comprises a second heat dissipating substrate, the plurality of the second fins comprise a third segment and a fourth segment, an end of the third segment is connected with the second heat dissipating substrate, an end of the third segment is connected with an end of the fourth segment, a height of the third segment is below than that of the fourth segment, to form first concave area, and the third baffle extends towards the third segment and partially located in the first concave area.

16. The film and television lamp according to claim 15, wherein, the film and television lamp further comprises a light source protection assembly, the light source protection assembly is connected with the housing assembly, and provided with a hollow cavity; and a part of the light source is provided in the hollow cavity, and the light source is thermally connected with a side of second heat dissipating substrate deviating from the plurality of the second fins; and the light source protection assembly comprises:

a sleeve, wherein, the hollow cavity is provided in the sleeve; and a cover, wherein, the cover is connected with the sleeve; the cover is connected with the housing assembly, and the cover is provided with a channel; and a part of the sleeve is contained in the channel and another part of the light source is provided in the channel.

17. The film and television lamp according to claim 16, wherein, a side of the sleeve departing from the light source is connected with a light transmittance element.

18. The film and television lamp according to claim 14, wherein, the second radiator further comprises side plates provided in face to each other, the fixing side plates are connected with the second heat dissipating substrate;

a hanging ear is provided on the fixing side plates, and a first through hole is provided on the hanging ear; and the first radiator is provided with a second through hole, and the first through hole and the second through hole are coaxially provided;

the film and television lamp further comprises a fixing part, and the first through hole and the second through hole are connected through the fixing part; and extending length of the plurality of the first fins in a third direction is less than that of the plurality of the second fins in the third direction; and direction of interval of the plurality of the first fins is parallel to that of the plurality of the second fins.

19. The film and television lamp according to claim 18, wherein, the film and television lamp further comprises a fixing part, the fixing part comprising a first part, a middle part and a second part, the first part being connected with an end of the middle part, the second part being connected with another end of the middle part, the first part being connected with the first through hole, and the second part being connected with the second through hole.

20. The film and television lamp according to claim 18, wherein, the housing assembly comprises a fourth housing; an outer side of the fixing side plates is connected with a fixing panel; and the fixing panel extends towards the fourth housing, and is connected with the fourth housing.

* * * * *